G. ARMITAGE.
KNIFE.
APPLICATION FILED JAN. 9, 1913.

1,095,617.

Patented May 5, 1914.

WITNESSES
Frank M. Horner
Edgar L. Stilson

INVENTOR
George Armitage
BY
L. L. Westfall ATTORNEY

UNITED STATES PATENT OFFICE.

GEORGE ARMITAGE, OF MISSOULA, MONTANA.

KNIFE.

1,095,617.  Specification of Letters Patent.  Patented May 5, 1914.

Application filed January 9, 1913. Serial No. 740,957.

*To all whom it may concern:*

Be it known that I, GEORGE ARMITAGE, citizen of the United States of America, residing at Missoula, in the county of Missoula and State of Montana, have invented certain new and useful Improvements in Knives, of which the following is a specification.

This invention pertains to knives and has for its object to provide a knife of such construction and detail parts as will especially adapt such knife for toilet purposes in the trimming of callous accumulations from the feet and hands and in the trimming of corns and bunions and for other similar purposes and the cutting or ripping of delicate fabrics.

Another object is to attach a handle to the blade of such knife in such a manner and to make the handle of such shape and consistency that the blade can be used in such a manner as to get special beneficial results therefrom as well as to provide for the removal of the handle so that the knife can be readily packed in a small space, such as in a small box and carried from place to place on the person or in a grip.

The particular construction and operation of such knife will be hereinafter described and illustrated in the accompanying drawings, in which—

Figure 1:
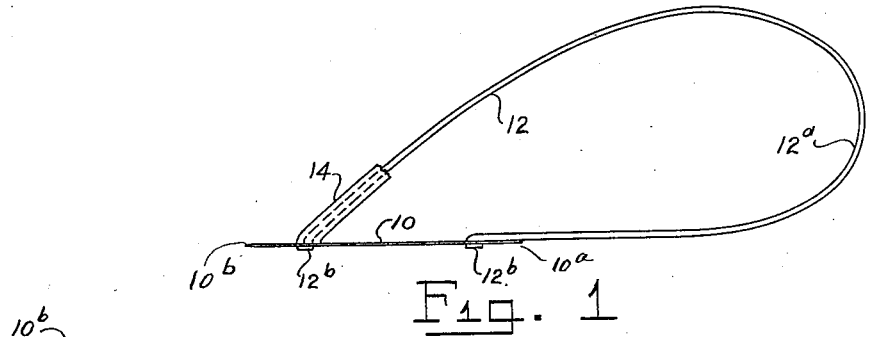
Figures 2, 3:
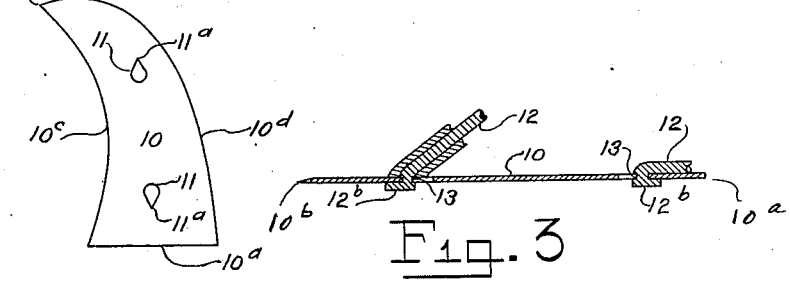
Figure 4:
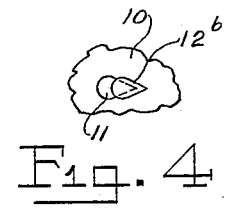
Figure 5:
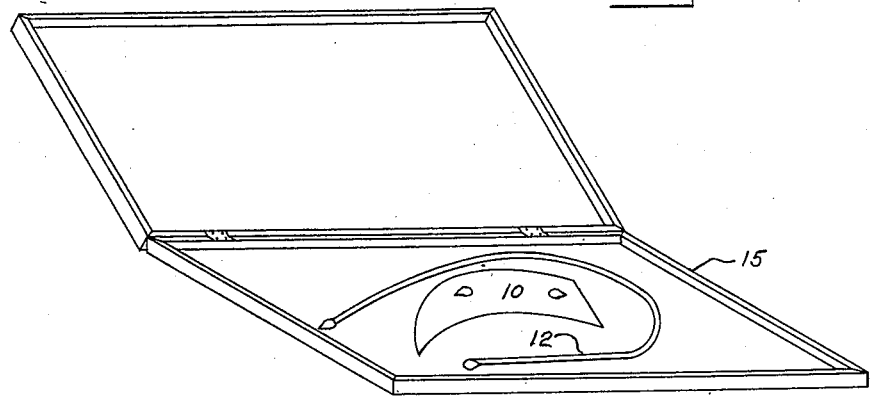

Figure 1, is an assembled front view of the knife, Fig. 2, is a top plan view of the blade, Fig. 3, is a broken-away vertical sectional view of the knife, Fig. 4, is a broken-away bottom plan view of the blade showing also the shoe at the base of the handle and the manner in which it binds against the bottom side of the blade, and Fig. 5, is a disassembled view of the knife together with a view of an open case in which the parts are placed.

The blade 10, as shown in Figs. 2 and 5, in plan view, is something of the shape of a powder-horn, the same having one end blunt $10^a$, one end terminating in a point $10^b$, one side concave $10^c$ and of a crescent shape and one side convex $10^d$. Near each end of the blade 10 is an opening 11 extending vertically therethrough, of substantially V shape, with the small end $11^a$ extending outwardly toward the end of the blade.

The handle 12 is made of spring steel or other suitable resilient material, and is of a substantially oval shape and when attached to the blade 10 is vertically disposed in relation thereto, with, however, the larger portion of the loop $12^a$ extending laterally beyond the end $10^a$ of the blade 10. The ends $12^b$ of the handle 12 are formed into V shaped shoes, small enough in dimensions to pass through the V shaped openings 11 in the blade 10. Slots 13 are cut in the handle 12 directly above the shoes $12^b$, of a vertical length sufficient to engage the thickness of the blade 10. The handle 12 being of resilient material will give the ends $12^b$ a tendency to spread outwardly so that when the shoes $12^b$ are passed through the V shaped openings 11 in the blade 10, the same will spread outwardly so that the slots 13 will engage the walls of the V shaped openings 11 as shown in Fig. 4, the shoes $12^b$ extending outwardly beyond the ends $11^a$ of the V shaped openings 11 in the blade 10. This construction provides a rigid connection between the handle 12 and the blade 10 and at the same time a construction that permits of the ready removal and replacement of the handle 12. The handle 12 may be provided with a leather or rubber covering, as at 14. Both surfaces $10^c$ and $10^d$ of the blade 10 are calculated to be brought to a razor-like sharpness and the upwardly and laterally disposed handle readily facilitates the use of the blade for the purposes named.

As shown in Fig. 5, the blade 10 and handle 12 when disassembled readily adapt the same for inclosure in a small case 15.

What I claim is,

In a knife, a blade having V shaped openings extending vertically through the same near the ends thereof, with the smaller ends of such openings extending outwardly toward the ends of the blade, an oval shaped handle of resilient material having V shaped shoes at the ends thereof and notches cut in the handle directly above the shoes of a vertical length corresponding to the thickness of the blade, the main body of the handle extending laterally beyond the end of the blade, one end of the same lying substantially in the plane of the blade for a major portion of its length while the other end makes an angle with said plane, the handle being attached to the blade through the V shaped openings therein, with the main body of the handle on one side of the blade and the shoes on the other.

In testimony whereof I affix my signature in presence of two witnesses.

GEORGE ARMITAGE.

Witnesses:
H. T. WILKINSON,
DAN H. ROSS.

Copies of this patent may be obtained for five cents each, by addressing the "Commissioner of Patents, Washington, D. C."